United States Patent
Scarlatella et al.

(10) Patent No.: US 9,165,237 B2
(45) Date of Patent: Oct. 20, 2015

(54) SIM CARD ADAPTER

(71) Applicants: STMICROELECTRONICS S.r.l., Agrate Brianza (IT); STMICROELECTRONICS INTERNATIONAL N.V., Amsterdam (NL)

(72) Inventors: Michele Scarlatella, Naples (IT); Mariarosaria Migliaccio, Caserta (IT); Paolo Frallicciardi, Salerno (IT); Attilio Derosa, Avellino (IT)

(73) Assignees: STMICROELECTRONICS S.R.L., Agrate Brianza (MB) (IT); STMICROELECTRONICS INTERNATIONAL N.V., Amsterdam (NL)

( * ) Notice: Subject to any disclaimer, the term of this patent is extended or adjusted under 35 U.S.C. 154(b) by 68 days.

(21) Appl. No.: 14/103,011

(22) Filed: Dec. 11, 2013

(65) Prior Publication Data

US 2014/0166763 A1   Jun. 19, 2014

(30) Foreign Application Priority Data

Dec. 19, 2012   (IT) .......................... MI2012A02184

(51) Int. Cl.
*G06K 19/06* (2006.01)
*G06K 19/077* (2006.01)

(52) U.S. Cl.
CPC ..... *G06K 19/07739* (2013.01); *Y10T 29/49117* (2015.01)

(58) Field of Classification Search
USPC .................. 235/492, 487, 451; 361/737, 731
See application file for complete search history.

(56) References Cited

U.S. PATENT DOCUMENTS

| | | | |
|---|---|---|---|
| 7,922,097 B2 * | 4/2011 | Yoshikawa et al. | 235/492 |
| 2005/0231921 A1 * | 10/2005 | Noda et al. | 361/737 |
| 2007/0127220 A1 * | 6/2007 | Lippert et al. | 361/737 |
| 2010/0267419 A1 * | 10/2010 | Nishizawa et al. | 455/558 |
| 2012/0231650 A1 * | 9/2012 | Tian et al. | 439/374 |
| 2014/0104767 A1 * | 4/2014 | Sutherland et al. | 361/679.02 |

FOREIGN PATENT DOCUMENTS

FR   2882175   8/2006

* cited by examiner

*Primary Examiner* — Ahshik Kim
(74) *Attorney, Agent, or Firm* — Allen, Dyer, Doppelt, Milbrath & Gilchrist, P.A. Attorneys at Law

(57) ABSTRACT

A SIM card adapter assembly is to adapt a SIM card to a SIM slot. The adapter assembly includes a SIM card plastic support including a first portion of a predetermined thickness. The SIM card is removably attached and a second portion has an increased thickness wherein at least one adapter is removably attached.

27 Claims, 12 Drawing Sheets

2FF

3FF

4FF

SIM CARD ADAPTER

FIELD OF THE INVENTION

The present invention relates to an adapter for adapting a SIM card to a SIM slot. More particularly, the invention relates to an adapter to adapt a size of the SIM card to a size of the SIM slot of a reader, for example, a mobile phone or mobile device intended to read the SIM card. The invention further relates to a method for adapting a SIM card to a SIM slot, including the step of plugging the SIM card in an adapter having substantially a same size of the SIM slot.

BACKGROUND OF THE INVENTION

As known, an adapter for a SIM card is a plastic frame on which a SIM card is applied or mounted for facilitating the plugging in of the SIM card in a SIM slot of a reader. In this respect, SIM cards having different sizes are available and currently manufactured, but readers include only one SIM slot and they are generally structured to receive a SIM card with a predetermined standard size.

For example, according to a standard ETSI TS 102 221, there are only a few currently worldwide accepted standard sizes, for instance: a 2FF SIM card (Plug-in UICC) has a size of 25 mm×15 mm and a thickness of 0.76 mm; a 3FF SIM card (Mini-UICC) has a different size of 15 mm×12 mm and a thickness of 0.76 mm; and a more recent 4FF SIM card (micro-UICC) has a different size of 11.9×8.8 mm and a different thickness of 0.67 mm. Thus, in the 4FF SIM card, not only the width and length of the card are reduced with respect to 2FF and 3FF SIM cards, but also the thickness.

FIGS. 1a-1c are top views of those 2FF, 3FF and 4FF standard SIM cards, respectively. The inner part of each figure represents a microchip and the portion delimited by dashed lines represents the support in which the microchip is packaged.

FIGS. 2 and 3 schematically represent in more detail the form factors of a so called Plug-in UICC and Mini-UICC according to the above mentioned standard ETSI TS 102 221, and FIG. 4 schematically represents the form factor of a so called micro-UICC according to the specification SCP(12) 000007.

On the other hand, some readers have a 2FF slot adapted to receive only a 2FF SIM card, i.e. unable to receive a 3FF or 4FF SIM card because they are too large. Some other readers have a 3FF slot for a 3FF card which is unable to receive a 4FF SIM card, because it is too large. More recent readers have a 4FF slot adapted to read only the 4FF SIM card.

In view of the above, it has been common to use adapters that have been designed to adapt the different SIM cards to different slots of the readers.

An adapter is normally structured with a plastic frame having a same size as the slot wherein it is inserted and delimits an inner and empty space wherein the SIM card is received. Along the inner perimeter of the frame, some tongues or tabs are provided to support the SIM card within such an empty space.

For example, with reference to the examples of FIGS. 5b and 5c, a 2FF adapter has a central empty space or hole for receiving a 3FF SIM card (FIG. 5c) or a 4FF SIM card (FIG. 5b) and a plastic frame (outer perimeter) of a size substantially corresponding to a size of the 2FF slot. Similarly, FIG. 5a represents a 3FF adapter having a hole for receiving a 4FF SIM card and a plastic frame of a size corresponding to a size of the 3FF slot.

These adapters have some drawbacks. They may be easily lost due to their small size, which corresponds to the size of the slot of the reader, as explained above. Moreover, they are fragile, since the tongues T along the inner perimeter of the frame may be easily broken and when broken, the 4FF SIM can no longer be supported in the hole of the plastic frame and thus within the SIM slot.

Furthermore, the telecom operators or SIM card providers may desirably be provided with an adapter for each 4FF SIM card they sell, but this does not always happen, since the adapters are produced separately from the SIM card. In this respect, the production cost may be high, since the manufacturing process of the adapters of FIG. 5a-5c is different, not scaled and independent from the manufacturing process of the SIM cards of the samples shown in FIG. 1a-1c, for example, from the manufacturing process resulting in the 4FF SIM card plastic support represented in FIG. 6, which includes the 4FF SIM card to be adapted, integrated in the plastic support, according to the prior art.

The problem to be addressed by the present embodiments is thus to reduce the production costs, improve the robustness of the adapters, for example, when used within a slot or when stocked outside it, and to help in avoiding misplacing the adapters, thus overcoming the above mentioned disadvantages and limitations.

SUMMARY

The approach of the present embodiment is to integrate one or more removable or detachable adapters in a first portion of a plastic support, wherein the plastic support comprises a second portion including a SIM card and having a reduced thickness with respect to the thickness of the adapters. Advantageously, the adapters are provided with the SIM card to be adapted in a same plastic support and are protected within the plastic support before their use in a slot. The support helps in avoiding losing the adapter, since it is larger and more easy to manipulate than the adapter.

The adapter, which is separated from the SIM card in the same plastic support, comprises a bottom surface having a size substantially corresponding to a size of a SIM slot and a frame on the bottom surface which delimits an opening to receive the SIM card on the bottom surface. Advantageously, the adapter has no hole or tongues for supporting the SIM and this is supported by the bottom surface having a stronger structure, when the adapter is used within a slot or when it stocked, also after its detachment from the plastic support.

Advantageously, the adapter and the SIM card are manufactured in a same process which produces the plastic support, simply providing a portion of the plastic support which is thicker than the portion including the adapters.

In an embodiment the SIM card is a 4FF SIM card and the adapter includes at least one adapter for a 2FF SIM slot and/or for a 3FF SIM slot.

According to the approach described above, the shortcomings are addressed by a SIM card adapter to adapt a SIM card to a SIM slot, characterized by comprising a plastic support comprising a first portion of a predetermined thickness, wherein the SIM card is removably attached, and a second portion of an increased thickness, wherein the adapter is removably attached.

More particularly, the SIM card includes a microchip and a support for the microchip. A precut line delimits the microchip and the support wherein it is packaged from the other portion of the plastic support, and allows an easy detachment of the SIM card from the plastic support. Preferably, the first portion has a same thickness as the SIM card.

In an embodiment, the SIM card is a 4FF SIM card for a 4FF SIM slot and the adapter is a 2FF adapter or a 3FF adapter to adapt the 4FF SIM card to a 2FF SIM slot or 3FF SIM slot. Also the adapter is delimited by a precut line which allows an easy detachment of the adapter from the SIM card plastic support.

In an embodiment, the second portion has a same thickness as the adapters. In this case, once the adapter is detached from the SIM card plastic support it leaves a hole in the SIM card plastic support but this is no longer necessary for adapting the SIM card.

In one embodiment, the second portion has a same thickness of a 2FF SIM card or a 3FF SIM card. Thus, the adapter adapts the SIM card to a SIM slot for 2FF SIM card (also indicated as 2FF SIM slot) or to a SIM slot for 3FF SIM card (also indicated as 3FF SIM slot).

In another embodiment, the second portion comprises a plurality of adapters. For instance, a first adapter and a second adapter are included in the thickness of the second portion. The first adapter and the second adapter may be adapters for a 2FF SIM slot and for 3FF SIM slot with a same thickness. Advantageously, the adapter not only adapts the width and length of the 4FF SIM card to a 2FF SIM slot or to a 3FF SIM slot, but it adapts also the thickness of the 4FF SIM card to these slots.

In a further embodiment, a first and second adapter or a plurality of adapters are nested one within the other within the second portion of the plastic support.

Of course, nothing prevents that, according to the embodiments, the plastic support has also a third or further portions of a different thickness with respect to the first and second portions, wherein one or more detachable adapters of different thickness are integrated.

In another aspect, the adapter(s) includes a bottom support, a plastic frame around the bottom surface and an opening to receive the SIM card within the plastic frame, wherein the bottom support is arranged to contact and to support the SIM card. The bottom support preferably is formed by a portion of the bottom surface of the SIM card plastic support. The plastic support is substantially rectangular and may preferably have a size of a credit card.

In an embodiment, the plastic support has a flat surface and a counter-posed surface having a stepwise structure. A first step in the stepwise structure is formed between a surface of the second portion, i.e. the portion including the adapter, and a surface of the first portion, i.e. the portion including the SIM card. The SIM card is packaged in the first portion with contact areas substantially coplanar with the surface of the first portion, and arranged to be contacted by a reader. A second and third steps are formed in the first portion to delimit recesses for receiving the SIM card.

The steps are preferably obtained by a milling process, executed at three predetermined levels. At a first level, the process reduces a thickness of the plastic body in a predetermined area, to obtain the first portion, for example, having a thickness of the 4FF SIM card.

The milling process executed at a second level delimits a first recess in the first portion. Edges or contact areas of the SIM card are supported and glued on a bottom surface of the first recess. At a third and lower level, the milling process delimits in the first portion of the plastic support a second recess, which is deeper than the first recess and able to receive an encapsulation resin of the SIM card. The encapsulation layer is attached below the contact areas and enclosed in the second recess by the contact areas. While the term SIM card and SIM slot have been used in the above description, it is clear that the adapter of the present embodiments can be used to adapt any IC Card, i.e. any microchip embedded or packaged into a support having a predetermined size, to an IC Card slot.

The problem described above is also addressed by a method to adapt a SIM card to a SIM slot, characterized by providing a SIM card plastic support including a first portion of a predetermined thickness, wherein the SIM card is removably attached, and a second portion of an increased thickness, wherein the adapter is removably attached, detaching the adapter from the SIM card plastic support, detaching the SIM card from the same SIM card plastic support and plugging the SIM card in the adapter to obtain an adapted SIM card having a thickness substantially corresponding to the thickness of the second portion of the plastic support.

BRIEF DESCRIPTION OF THE DRAWINGS

The integration of one or more adapters within a plastic support in which also the SIM card to be adapted is included will be apparent by the description given below, with reference to the annexed drawings only as a support for the explanation and without limiting the scope of protection of the embodiments.

DETAILED DESCRIPTION OF THE EMBODIMENTS

The accompanying drawings, which are included to provide a further understanding of the disclosure and are incorporated in and constitute a part of this application, illustrate embodiment(s) of the disclosure and together with the description serve to explain the principles of the disclosure.

Figure 1A:
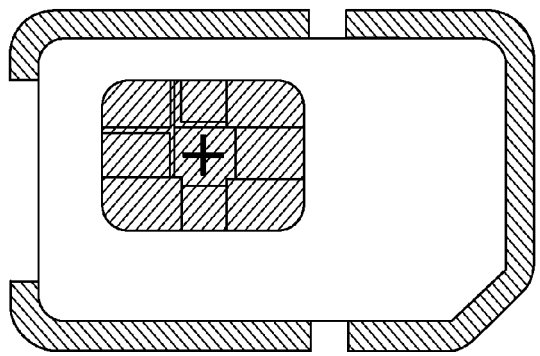
FIG. 1a-1c are top views of SIM cards 2FF, 3FF, 4FF to be adapted to a slot, according to the prior art.
Figure 1B:
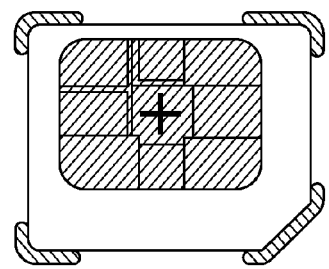
Figure 1C:
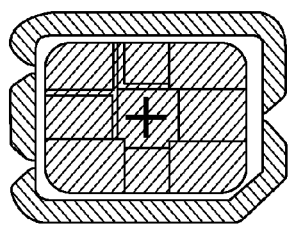
Figure 2:
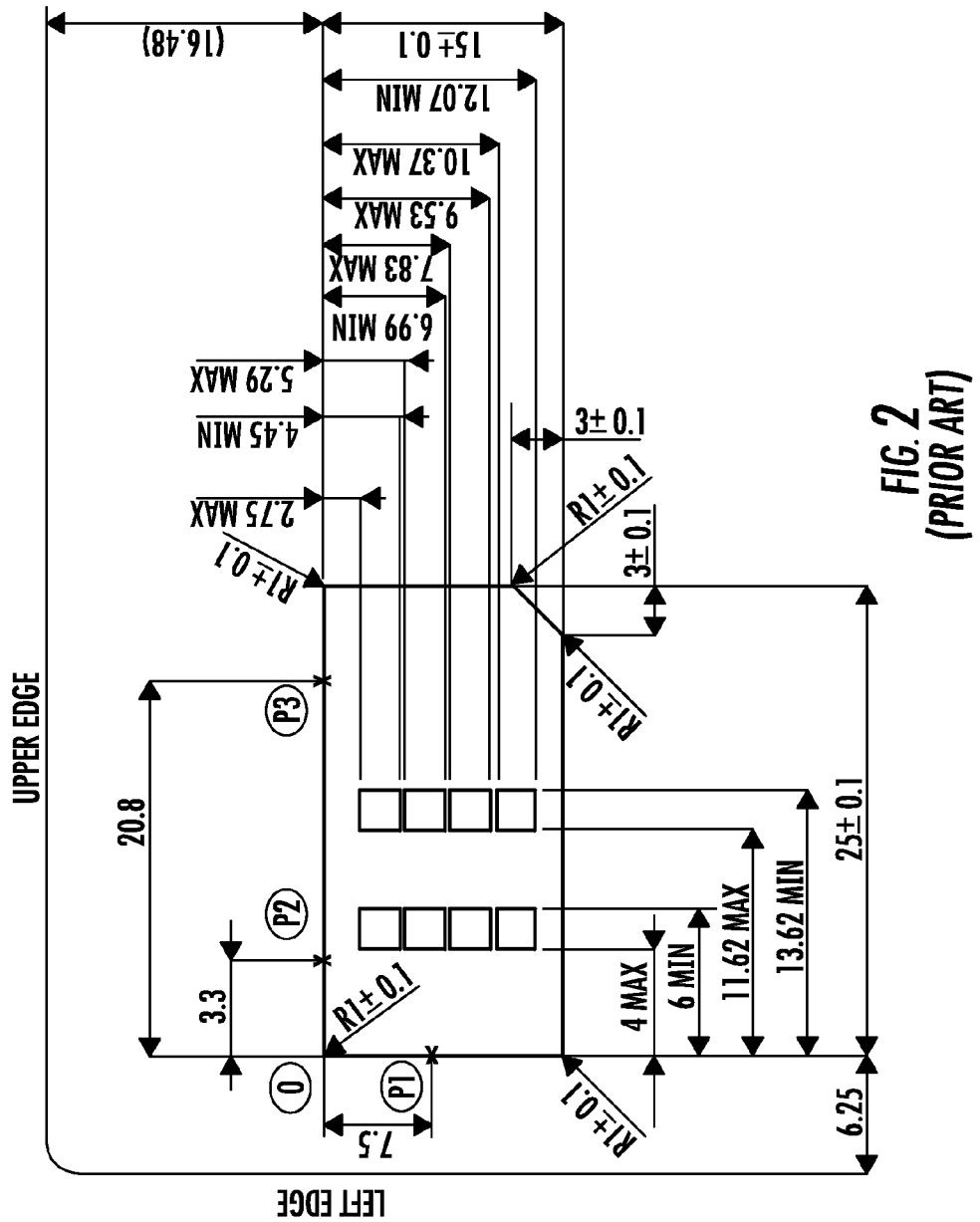
FIGS. 2-4 schematically represent the form factor specification of the SIM cards to be adapted, according to the prior art.
Figure 3:
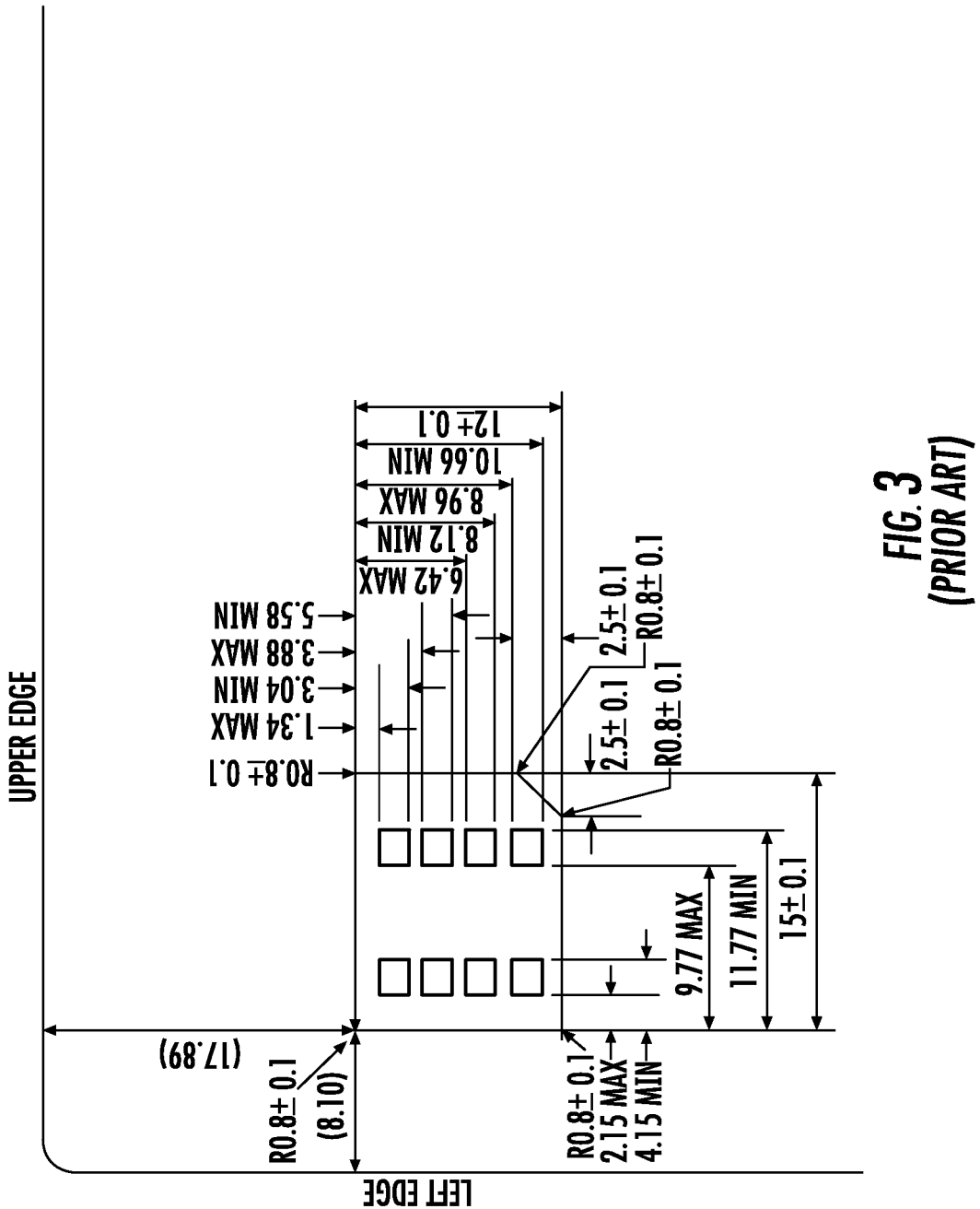
Figure 4:
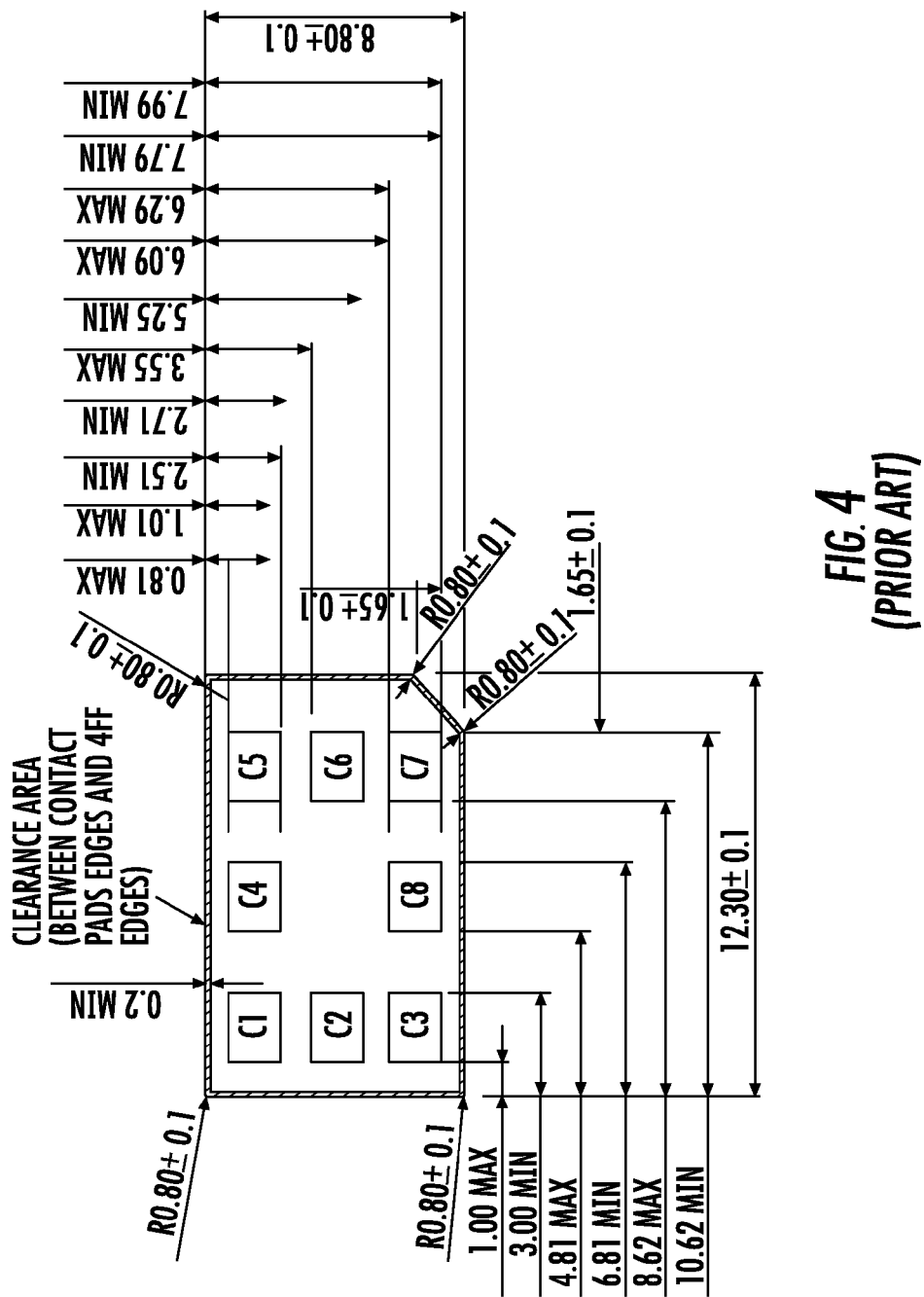
Figure 5C:
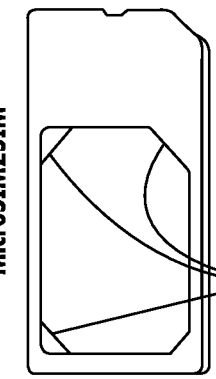
FIG. 5a-5c represent adapters for SIM cards, according to the prior art.
Figure 5B:
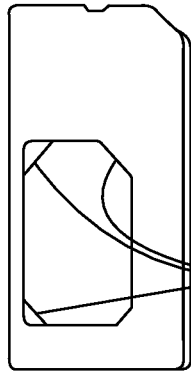
Figure 5A:
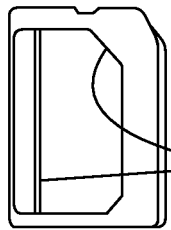
Figure 6:
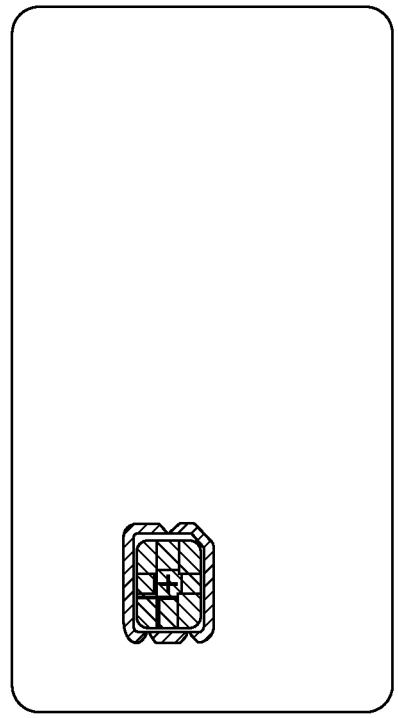
FIG. 6 represents a plastic support with a SIM card to be adapted with the adapters of FIG. 5a or 5b, according to the prior art.
Figure 7:
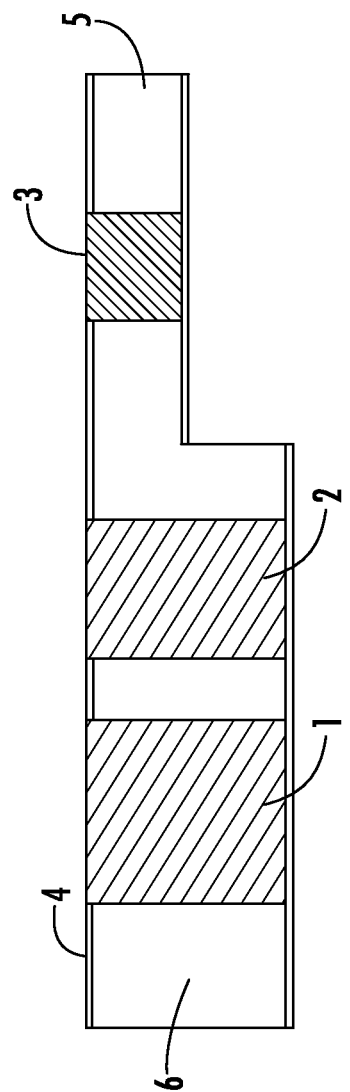
FIG. 7 is a lateral cross section of an adapter according to the present invention.
Figure 8:
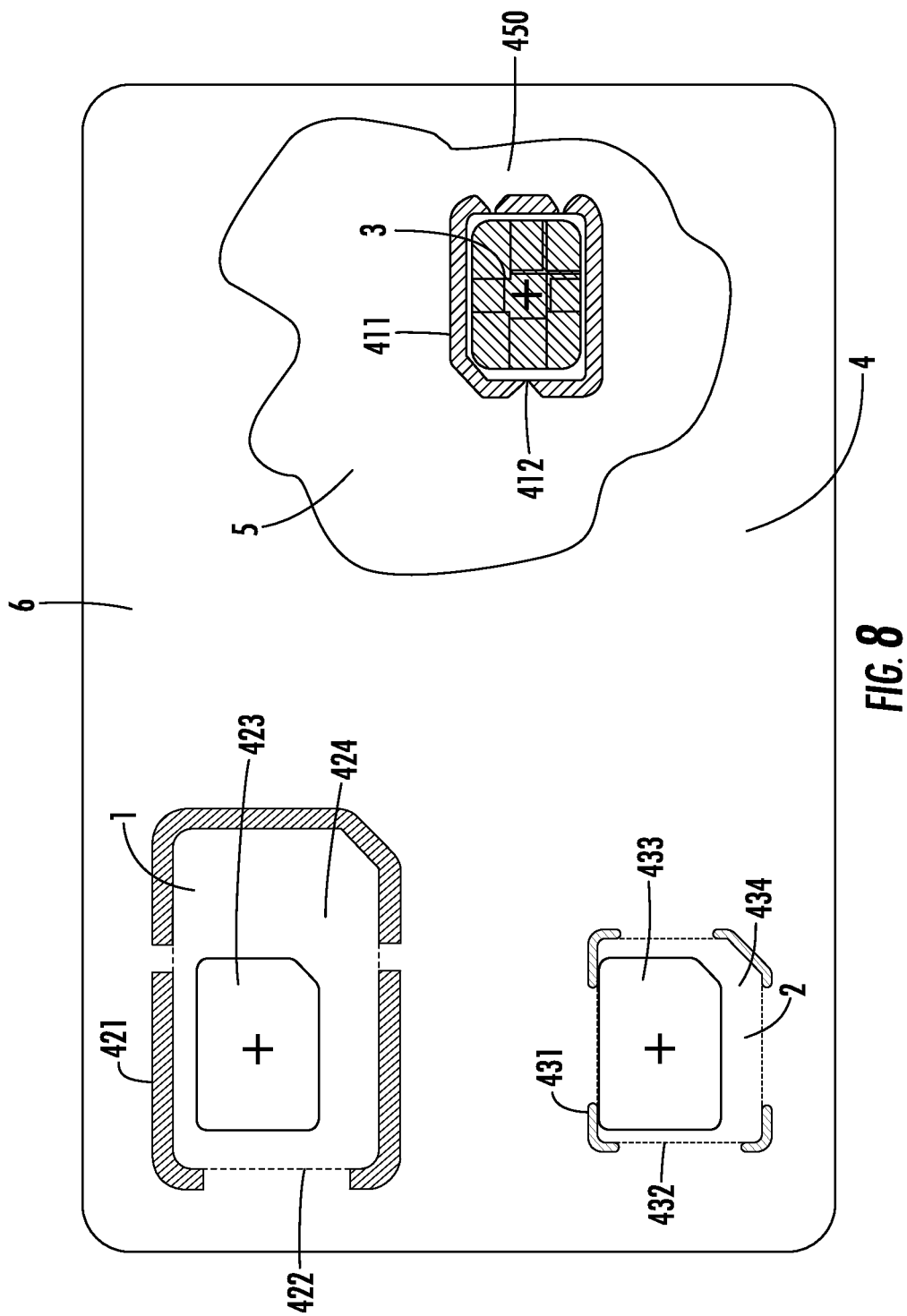
FIG. 8 is a top view of the adapter according to FIG. 7.

With reference to FIG. 8, different SIM card adapters 1, 2 structured according to the present embodiments to adapt a SIM card 3 to a SIM slot are schematically represented. Both adapters obtained in a SIM card plastic support 4 have a first portion 5 of a predetermined thickness wherein the SIM card 3 is removably attached, and a second portion of an increased thickness 6 wherein each of the adapters 1, 2 is removably attached. The different thickness of the portions is also schematically represented in a cross view in FIG. 7. The first portion 5 has preferably a same thickness as the SIM card 3.

For example, the SIM card 3 is a 4FF SIM card adapted to be inserted in a 4FF SIM slot without any specific adapter, while the adapter 1 is a 2FF adapter or a 3FF adapter to adapt the 4FF SIM card to a 2FF SIM slot or to a 3FF SIM slot, respectively. Preferably, also the second portion 6 has a same thickness of the portion wherein the adapters are obtained. The second portion 6 has, for example, a same thickness of a 2FF SIM card or a 3FF SIM card.

In an embodiment schematically represented in FIG. 8, the second portion 6 comprises a first adapter 1 and a second adapter 2, the first adapter 1 and the second adapter 2 being preferably adapters for a 2FF SIM slot and for a 3FF SIM slot, respectively, and the SIM card is preferably a 4FF SIM card. Of course, nothing prevents that the second portion comprises only one adapter or more than two adapters with a same or a different thickness.

One skilled in the art would understand that the above combination of components may be combined in a different manner for instance by the inclusion of a further kind of adapter or by the exclusion of a specific adapter no longer used by the market.

Figure 9:
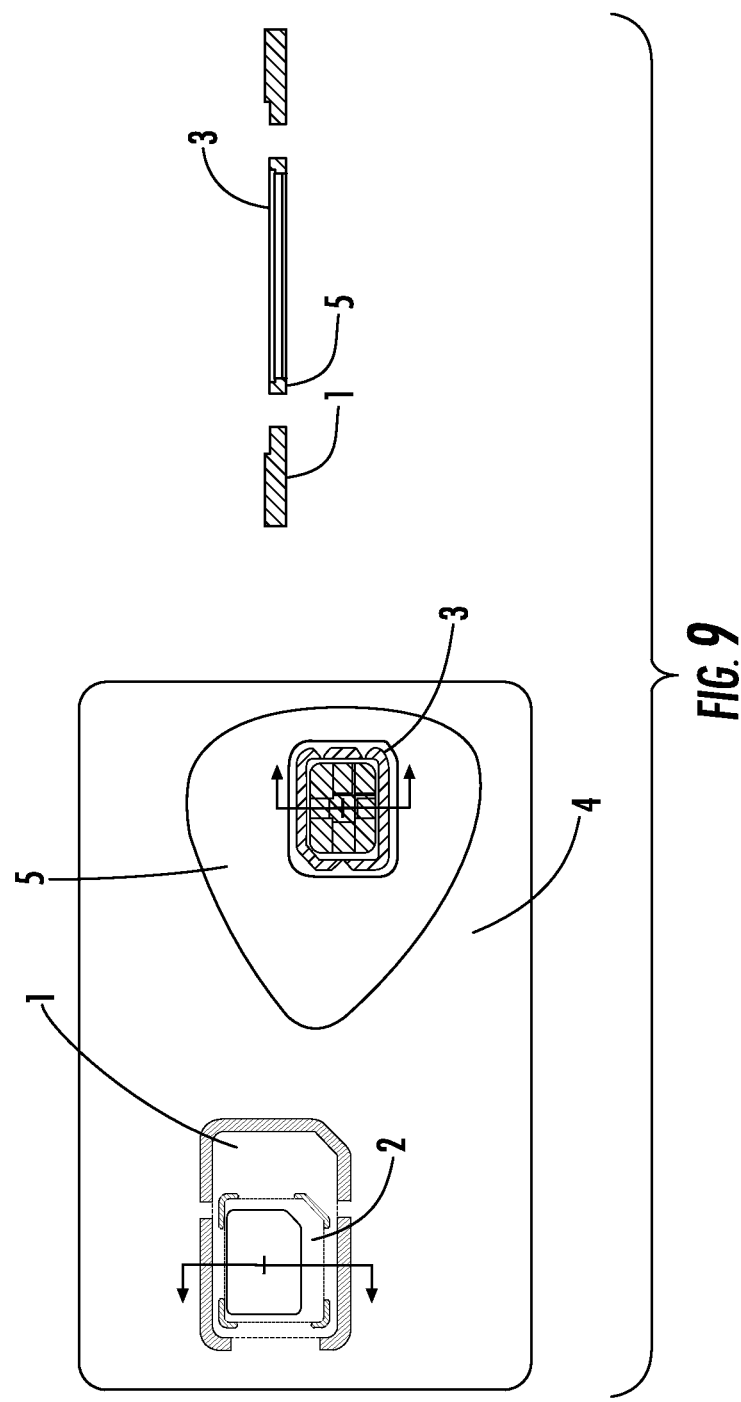
FIG. 9 represents an adapter according to another embodiment of the present invention.

In another embodiment, schematically represented in FIG. 9, a first 1 and second adapter 2 are nested one within the other in the second portion 6.

More particularly, the adapter(s) includes a bottom support 7, a plastic frame B around the bottom surface and an opening 9 to receive the SIM card 3 within the plastic frame, wherein the bottom support 7 is arranged to contact and to support the SIM card 3. Preferably, the bottom support 7 is a bottom surface 10 of the SIM card plastic support 5.

In a preferred embodiment, the SIM card plastic support 4 is substantially rectangular and has a size of a credit card.

Hereafter, further specific details according to the adapters are given. The plastic support has a body 4 for a smart card and integrates a SIM card 3 having a first size compatible with first-type mobile devices. The body 4 further integrates an adapter 1, 2 configured to receive the SIM card 3. The adapter 1, 2 may have a second size compatible with second-type mobile device. The second size is bigger than the first size, and the SIM card 3 is integrated in a different area of the body 4 with respect to the area in which the adapter is integrated, within the body. The body 4 is the plastic support of the SIM card 3.

Advantageously, a consumer may buy an adapter together with the SIM card, since the SIM card and the adapter are supported and/or integrated in the body. Moreover, while the supporting body in which a SIM card according to the prior art is discarded after the SIM card is detached, the supporting body according to the present embodiment is saved and used when the integrated adapter is required, thus also reducing trash.

Again with reference to FIG. 8, further advantageous features are here below given. The body 4 for smart card comprises the SIM card 3 having a first size compatible with first-type mobile device. Near the SIM card 3, spaces 411 are formed between the body 4 and the SIM card 3. SIM card 3 is fixed to the body 4 by fixing means or structure 412. The fixing means or structure 412 and the spaces 411 allow detachment of the SIM card 3 from the body 4.

The body 4 further comprises the adapter 2 configured to receive the SIM card 3. The adapter 2 has a second size compatible with second-type mobile device, and the second size is bigger than the first size. In other words, the size of the adapter 2 is bigger than that of the SIM card 3. The SIM card 3 is placed in a different area of the body 4 from that of the adapter 2. Since the SIM card 3 and the adapter 2 are placed in the body 4 together, any consumers or staff of a mobile device store can easily use or sell these with the appropriate mobile device.

The SIM card 3 has a thickness smaller than the thickness of the adapter 2. The thickness of the body 4 may be substantially the same as the thickness of the adapter 2. The SIM card 3 can be produced in the body 4 by cavity milling on 3 levels or by an injection molding process.

Figure 13:
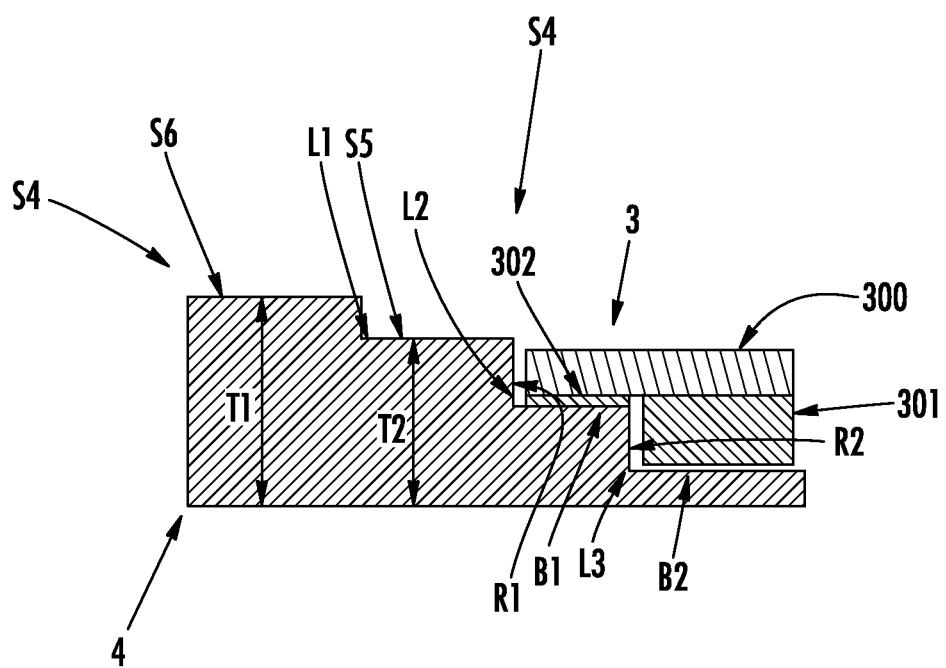
FIG. 13 is a lateral cross section of a portion of an adapter according to the present invention.

According to the present invention, the milling process is performed at three different levels L1-L3, as schematically represented in FIG. 13. At a first level L1, the process reduces a thickness T1 of the plastic body 4 or support 4, for example, from 780 microns to 670 microns, for obtaining the portion 5 of reduced thickness T2. The reduced thickness T2 substantially corresponds to a thickness of the SIM card 3, for example, to the thickness of the 4FF SIM card.

At a second level L2, the milling process is executed to delimit a recess R1 in the portion 5 of reduced thickness T2, on which edges 300 of the SIM card 3 are supported and glued. These edges are included in contact areas of the SIM card which are substantially coplanar with a surface S5 of the portion 5 of reduced thickness.

At a third and lower level L3, the milling process delimits a second and deeper recess R2 in the portion 5, wherein the encapsulation resin 301 of the SIM card 3 is received. When the SIM card is packaged in the plastic body, the contact area closes the opening of the first recess R1, with the encapsulation layer enclosed in the second recess R2. Substantially, the second recess R2 is formed as a hole in the bottom surface of the first recess R1. Preferably, the recesses R1 and R2 have a common axis, perpendicular to a base or bottom surface of the plastic support 4.

Again with reference to the lateral cross section of FIG. 13, the stepwise top surface of the plastic body 4 is indicated with S4. The surface S4 is formed in part by the surface S5 of the first portion 5 and in part by a surface S6 of the second portion 6 of the plastic body 4.

The surface S5 is lower than a surface S6 of the second portion 6 in which the adapter 1, 2 is embedded. A base B2 of the second recess R2 is below a base B1 of the first recess R1 and the base B1 is lower than the surface S5 of the first portion 5.

The body 4 may further comprise another adapter 1 configured to receive the SIM card 3. Such adapter 1 has a third size compatible with third-type mobile device. The third size is bigger than the second size. In other words, the adapter 1 is bigger than the adapter 2. The thickness of said another adapter 1 may be substantially the same as that of the adapter 2.

The form factor (FF) of the SIM card 3 may be 4FF of the ETSI standard, and the form factor of the adapter 2 may be 3FF of the ETSI standard. The form factor of the adapter 1 may be 2FF of the ETSI standard. The specification for the SIM card size is standardized in ETSI's TS 102 221.

More particularly, the adapter 2 may have a recess 433 for receiving and supporting the SIM card 3. Thus, the thickness from the bottom of the recess 433 to the opposite outer surface is smaller than the thickness of un-recessed area 434. In a similar way, the adapter 1 may have a recess 423 for receiving and supporting the SIM card 3. The thickness from the bottom of the recess 423 to the opposite outer surface is smaller than the thickness of an un-recessed area 424.

The adapters may include a cutting line or precut line 422, 432 to easily detach the adapters from the body 4. Moreover, some spaces 421, 431 may be formed between the body 4 and the adapters 1, 2. These spaces and cutting line 422, 432 make detachment easier.

In a modified embodiment, the adapter 2 may have a pass through hole for receiving the SIM card 3, the hole being delimited by a plastic frame of the support or body 4. The plastic frame surrounds the hole and is detachable from the support or body 4 due to a precut line in the support or body 4 delimiting the frame. The adapter 1 has a protruded portion protecting from the frame toward a center of the hole which supports the SIM card. In a similar way may be structured the adapter 1.

Figure 10:
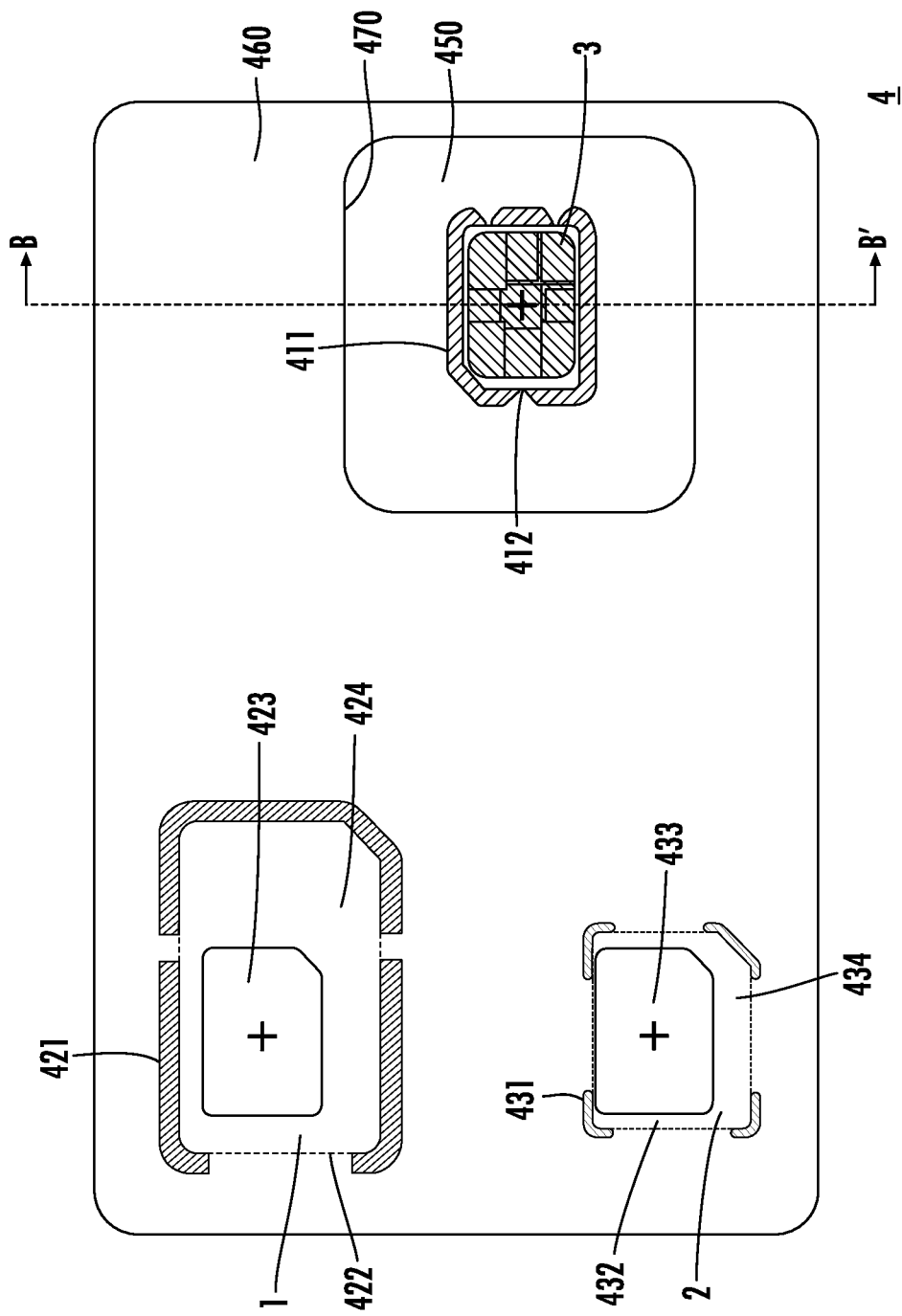
FIG. 10 is a top view of an adapter according to another embodiment of the present invention.
Figure 11:
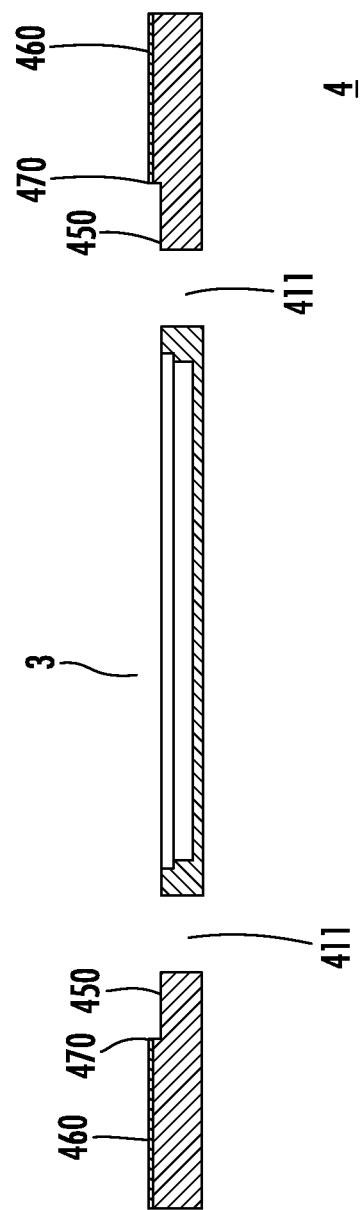
FIG. 11 is a lateral cross section of the adapter of FIG. 10.

FIG. 10 schematically shows the SIM card and its adapter according to another embodiment. According to this embodiment, an area 450 in the body 4 which surrounds the SIM card 3 may have the same thickness as that of the SIM card 3. The area 450 has a different thickness from the other area 460 of the body 4. The two areas 450, 460 are divided by a boundary 470. In the embodiment of FIG. 10, the shape of the boundary 470 is rectangular. FIG. 11 represents the cross section B-B' of the body of FIG. 10.

Figure 12:
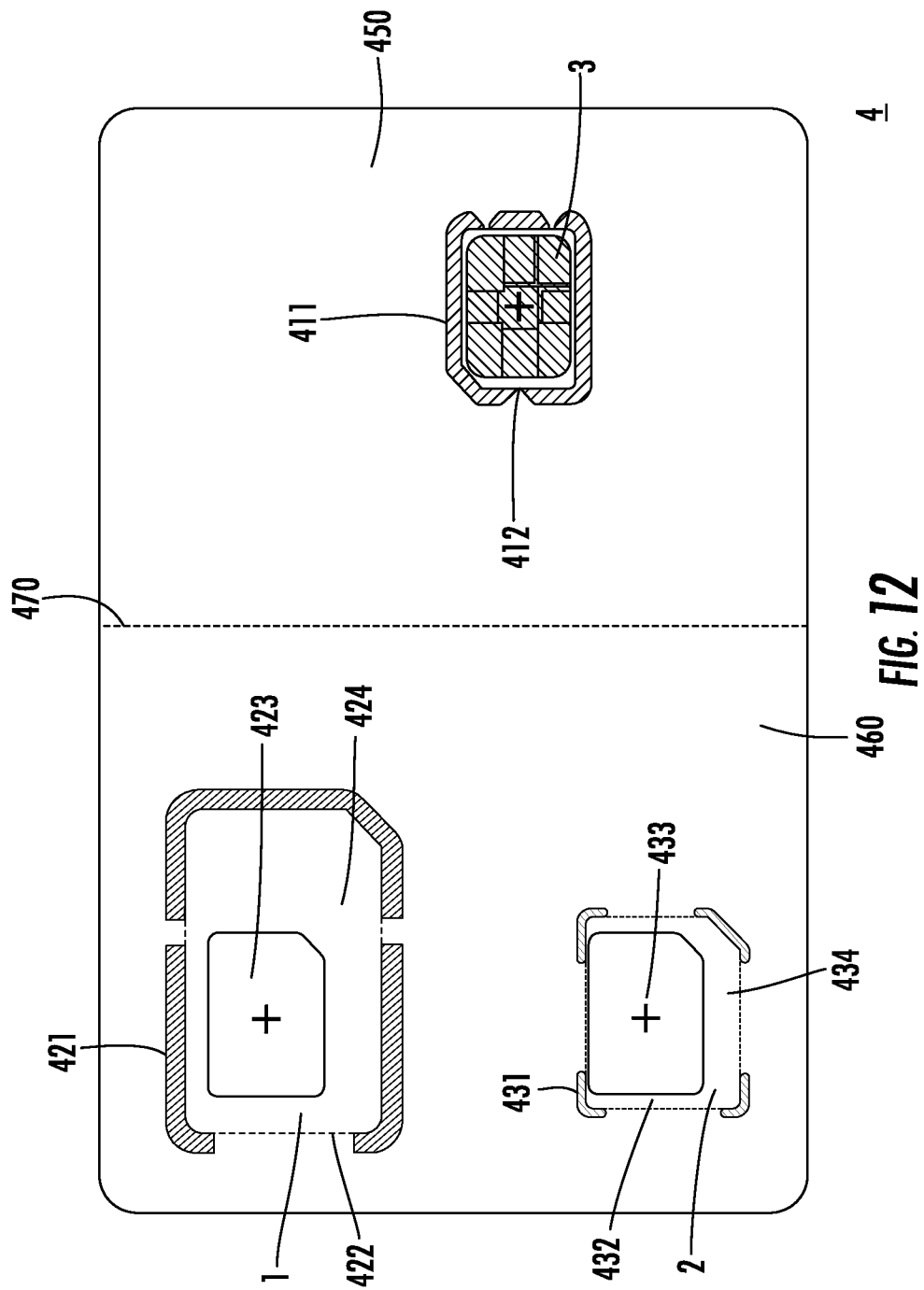
FIG. 12 is a top view of an adapter according to another embodiment of the present invention.

FIG. 12 schematically shows the SIM card and its adapter according to a further embodiment. In this embodiment, the body 4 may have a rectangular shape and comprise two longer edges and two shorter edges. The body 4 comprises a first plane 450 and a second plane 460 divided by a hypothetical line 470 extending perpendicularly across the body or plastic support 4, from a point of the first of two longer edges to a point of the second of two longer edges. In other words, the hypothetical line 470 is a boundary for the two planes 450, 460.

The SIM card 3 is placed in the first plane 450, and the adapters 1, 2 are placed in the second plane 460. The thickness of the first plane 450 is substantially the same as that of the SIM card 3, and the thickness of the second plane 460 is substantially the same as that of said adapters 1, 2.

Advantageously, a consumer buying the body for the SIM card according to the embodiments and the mobile device can avoid confirming the exact format factor of both SIM card and the mobile device. Then, if the consumer wants to insert the SIM to a mobile device supporting bigger a SIM, he doesn't have to buy another adapter, but can use the adapter in the body which has been already bought. For the telecommunication operator, the present embodiments relieve the problem of logistics which would otherwise be caused by a separately delivered SIM card and adapter.

Moreover, in the prior art it was inevitable to produce the smallest SIM card, e.g. 4FF SIM or nano SIM attached to the bigger body or card, since the size of the 4FF SIM is small and it is difficult to deliver, display in the store and sell the 4FF SIM card alone. After detaching the SIM, the rest of the card which is usually made of plastic becomes useless, and is usually thrown out. Thus, the embodiments advantageously reduce the plastic waste or trash.

At last, the structure of the adapter with a bottom surface is robust and its integration within the plastic support, especially before detachment, further protects the adapter.

The invention claimed is:

1. A subscriber identification module (SIM) card adapter assembly comprising:
   a SIM card support comprising a first portion having a first thickness, and a second portion having a second thickness greater than the first thickness;
   a SIM card removably attached to the first portion, with the SIM card configured to be received by a SIM slot having a first size; and
   at least one SIM card adapter removably attached to the second portion, with the at least one SIM card adapter configured to be received by a SIM slot having a second size different from the first size, and with the at least one SIM card adapter also configured to receive the SIM card so as to adapt the SIM card to the second size SIM slot.

2. The SIM card adapter assembly according to claim 1, wherein the SIM card has a same thickness as the first thickness.

3. The SIM card adapter assembly according to claim 1, wherein the SIM card comprises a 4FF SIM card configured to be inserted in a 4FF SIM slot without an adapter; and wherein the at least one adapter comprises at least one of a 2FF adapter and a 3FF adapter.

4. The SIM card adapter assembly according to claim 1, wherein the at least one SIM card adapter has a same thickness as the second thickness.

5. The SIM card adapter assembly according to claim 1, wherein the second thickness is the same as a thickness of a 2FF SIM card or a 3FF SIM card.

6. The SIM card adapter assembly according to claim 1, wherein the at least one adapter comprises a first adapter and a second adapter nested within the first adapter.

7. The SIM card adapter assembly according to claim 1, wherein the at least one adapter comprises a bottom support, a plastic frame around the bottom surface defining an opening receiving the SIM card.

8. The SIM card adapter assembly according to claim 7, wherein the bottom support is integrally formed with a bottom of the SIM card support.

9. The SIM card adapter assembly according to claim 1, wherein the SIM card support has a generally rectangular shape, and comprises plastic.

10. The SIM card adapter assembly according to claim 1, wherein the SIM card support has a flat base and a counter posed stepwise surface including a first step between an upper surface of the second portion and an upper surface of the first portion.

11. The SIM card adapter assembly according to claim 10, wherein the SIM card is substantially coplanar with the upper surface of the first portion.

12. The SIM card adapter assembly according to claim 10, wherein the first portion comprises a second step and a third step that delimit, respectively, a first recess and a second recess adapted to receive the SIM card; and wherein the first and second recesses are filled by the SIM card.

13. The SIM card adapter assembly according to claim 12, the first recess has a base that supports a contact area of the SIM card, and the second recess receives an encapsulation layer of the SIM card.

14. A subscriber identification module (SIM) card adapter assembly comprising:
   a SIM card support comprising a first portion having a first thickness, and a second portion having a second thickness greater than the first thickness, the first portion to removably receive a SIM card that is configured to be received by a SIM slot having a first size; and
   at least one SIM card adapter removably attached to the second portion, with the at least one SIM card adapter configured to be received by a SIM slot having a second size different from the first size, and with the at least one SIM card adapter also configured to receive the SIM card so as to adapt the SIM card to the second size SIM slot.

15. The SIM card adapter assembly according to claim 14, wherein the first thickness is the same as the SIM card.

16. The SIM card adapter assembly according to claim 14, wherein the at least one adapter comprises at least one of a 2FF adapter and a 3FF adapter.

17. The SIM card adapter assembly according to claim 14, wherein the at least one SIM card adapter has a same thickness as the second thickness.

18. The SIM card adapter assembly according to claim 14, wherein the second thickness is the same as a thickness of a 2FF SIM card or a 3FF SIM card.

19. The SIM card adapter assembly according to claim 14, wherein the at least one adapter comprises a first adapter and a second adapter nested within the first adapter.

20. The SIM card adapter assembly according to claim 14, wherein the SIM card support has a generally rectangular shape, and comprises plastic.

21. A method for making a subscriber identification module (SIM) card adapter assembly comprising:
forming a SIM card support comprising a first portion having a first thickness, and a second portion having a second thickness greater than the first thickness;
removably attaching a SIM card to the first portion, with the SIM card configured to be received by a SIM slot having a first size; and
removably attaching at least one SIM card adapter to the second portion, with the at least one SIM card adapter configured to be received by a SIM slot having a second size different from the first size, and with the at least one SIM card adapter also configured to receive the SIM card so as to adapt the SIM card to the second size SIM slot.

22. The method according to claim 21, wherein the SIM card has a same thickness as the first thickness.

23. The method according to claim 21, wherein the SIM card comprises a 4FF SIM card configured to be inserted in a 4FF SIM slot without an adapter; and wherein the at least one adapter comprises at least one of a 2FF adapter and a 3FF adapter.

24. The method according to claim 21, wherein the at least one SIM card adapter has a same thickness as the second thickness.

25. The method according to claim 21, wherein the second thickness is the same as a thickness of a 2FF SIM card or a 3FF SIM card.

26. The method according to claim 21, wherein the at least one adapter comprises a first adapter and a second adapter nested within the first adapter.

27. The method according to claim 21, wherein the SIM card support has a generally rectangular shape, and comprises plastic.

\* \* \* \* \*